United States Patent [19]

Iwabuchi et al.

[11] 4,143,409
[45] Mar. 6, 1979

[54] TRANSDUCER FEEDING MECHANISM IN AN APPARATUS FOR RECORDING AND REPRODUCING A SIGNAL ON AND FROM A ROTARY RECORDING MEDIUM

[75] Inventors: Yoshitaka Iwabuchi, Yamato; Seiichi Takashima, Ayase; Togo Nishiyama, Yokohama, all of Japan

[73] Assignee: Victor Company of Japan, Ltd., Yokohama, Japan

[21] Appl. No.: 827,023

[22] Filed: Aug. 23, 1977

[30] Foreign Application Priority Data

Aug. 26, 1976 [JP] Japan .................................. 51-101950

[51] Int. Cl.² ........................ G11B 21/08; G11B 5/012
[52] U.S. Cl. ....................................... 360/106; 360/78; 360/105; 360/86
[58] Field of Search ................. 360/106, 109, 105, 86, 360/78, 97–99; 74/27–29, 33

[56] References Cited

U.S. PATENT DOCUMENTS

| | | | |
|---|---|---|---|
| 3,106,612 | 10/1963 | Lemelson | 360/106 |
| 3,124,789 | 3/1964 | Wasylenko | 360/106 |
| 3,749,827 | 7/1973 | Kinjo et al. | 360/106 |
| 3,867,723 | 11/1973 | Penfold et al. | 360/98 |
| 3,954,272 | 5/1976 | Leedom | 360/105 |

*Primary Examiner*—Alfred H. Eddleman
*Attorney, Agent, or Firm*—Haseltine, Lake & Waters

[57] ABSTRACT

A transducer feeding mechanism in an apparatus for recording and reproducing a signal on and from a rotary recording medium by means of a transducer fed over the recording medium in the radial direction thereof comprises a rotational motive power source having a rotary shaft and a pinion provided on the shaft, a rack meshed with said pinion and fed in translational movement by the rotation of the pinion, at least two guide bars extending parallelly in the direction of feeding of the transducer, a first feeding carriage on which the rack is mounted and which is guided by one of the guide bars, biasing means provided on the first feeding carriage and functioning to contact another guide bar in an elastic manner and to urge the first feeding carriage in a direction to cause the rack to mesh further with the pinion, a second feeding carriage on which the transducer is mounted, and which is guided by said other guide bar, a guide member mounted on the second feeding carriage and contacting in a rotationally displaceable manner said one of the guide bars, and engagement means functioning to place the first and second feeding carriages in contacting engagement in the feeding direction along the guide bars and in a mutually displaceable state within a plane perpendicular to the feeding direction.

9 Claims, 4 Drawing Figures

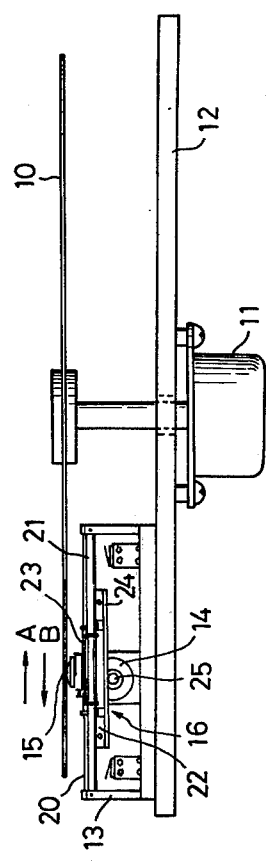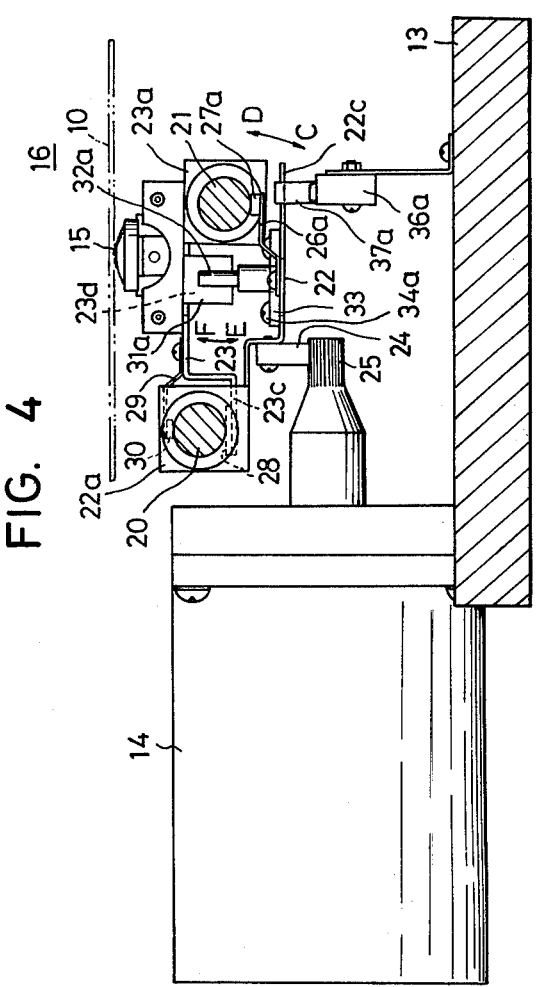

TRANSDUCER FEEDING MECHANISM IN AN APPARATUS FOR RECORDING AND REPRODUCING A SIGNAL ON AND FROM A ROTARY RECORDING MEDIUM

BACKGROUND OF THE INVENTION

The present invention relates generally to transducer moving or feeding mechanisms in apparatuses for recording and reproducing of signals on and from rotary recording mediums. More particularly the invention relates to a mechanism for feeding in traverse movement a transducer for carrying out recording and reproducing signals on and from a rotary recording medium, the mechanism being capable of thus feeding the transducer in an accurate and positive driving power transmission state and, moreover, without shock or vibration.

Heretofore, apparatuses for recording and reproducing magnetic discs of the type wherein a magnetic head is caused to move intermittently over a rotary magnetic disc thereby to record and reproduce video signals with concentric tracks have been reduced to practice. As a device for moving the head in an apparatus of this type for recording and reproducing magnetic discs, the same assignee as that of the present invention, has proposed a device as disclosed in the specification of U.S. Pat. No. 3,749,827, entitled "ENDLESS NON-METALLIC FOR INTERMITTENTLY MOVING A TRANSDUCER HEAD TRANSVERSELY ACROSS A ROTARY MAGNETIC HEAD", in which an endless belt passed around a driving shaft driven by a stepping motor (pulse motor) and a driven shaft are moved intermittently, and a magnetic head mounted on the endless belt is caused to move in traverse movement over the magnetic disc.

This device, however, has been accompanied by difficulties such as permanent elongation in the endless belt as result of a long period of use and the occurrence of uneven elongation in the belt when the driving shaft and the driven shaft are not precisely parallel, whereby the magnetic head cannot be moved over the magnetic disc accurately and positively over specific tracks. A further problem accompanying this device is that the magnetic head cannot be moved with accurate pitch because of occurrences such as slippage between the belt and the shafts, variation in the difference between the tensions in the belt on the driving shaft side and on the driven shaft side, and stretching and shrinking of the belt due to variations in temperature.

Accordingly, in order to solve the above described problems, we have devised a moving mechanism so constituted that, instead of the head moving mechanism described above wherein a head and shafts are used, a rack is fixed to a moving base or carriage on which a magnetic head is fixedly mounted, and a pinion provided on the rotor shaft of a motor is adapted to mesh with this rack, whereby rotation of the pinion by the motor causes the rack, and therefore the head, to move. In a device of this mechanical arrangement, however, there are a number of problems such as low accuracy of movement position of the head due to backlash between the rack and the pinion and transmission to the head of shocks between the rack and the rotating pinion, whereby satisfactory head movement cannot be attained. These problems become particularly serious in the case of an apparatus for recording and reproducing magnetic discs of a system wherein the motor rotates intermittently, and the head is moved intermittently.

SUMMARY OF THE INVENTION

Accordingly, it is a general object of the present invention to provide a novel and useful transducer feeding mechanism in an apparatus for recording and reproducing a rotary recording medium in which mechanism the above described problems have been solved.

Another and specific object of the invention is to provide a transducer feeding mechanism in an apparatus for recording and reproducing a rotary recording medium in which mechanism a first carriage provided with a rack driven by a pinion driven in turn by a motor and a second carriage provided with a transducer are provided mutually separately, and the first carriage is adapted to engage the second carriage only with respect the transducer feeding direction. By this provision according to the invention, transmission of unwanted shock in directions other than the moving direction from the first carriage to the second carriage is prevented, whereby the head can be fed accurately and positively.

Still another object of the invention is to provide a transducer feeding mechanism of the above stated character in which the first carriage is, independently of the second carriage, imparted with a bias so that the rack meshes with the pinion with substantially no backlash. By this provision of the invention, the rack and pinion mesh positively with each other, whereby the head is accurately fed in intermittent movement.

A further object of the invention is to provide a transducer feeding mechanism of the character referred to above in which the second carriage will be moved satisfactorily even if two guide bars are not parallel.

Other objects and further features of the invention will be apparent from the following detailed description with respect to a preferred embodiment of the invention when read in conjunction with the accompanying drawings.

BRIEF DESCRIPTION OF THE DRAWINGS

In the drawings:

FIG. 1 is an elevational view of one example of an apparatus for recording and reproducing on and from a rotary recording medium provided with a transducer feeding mechanism according to the invention;

FIG. 4 is a side elevational view of the same mechanism taken along IV — IV line in FIG. 3.

DETAILED DESCRIPTION

Figure 2:
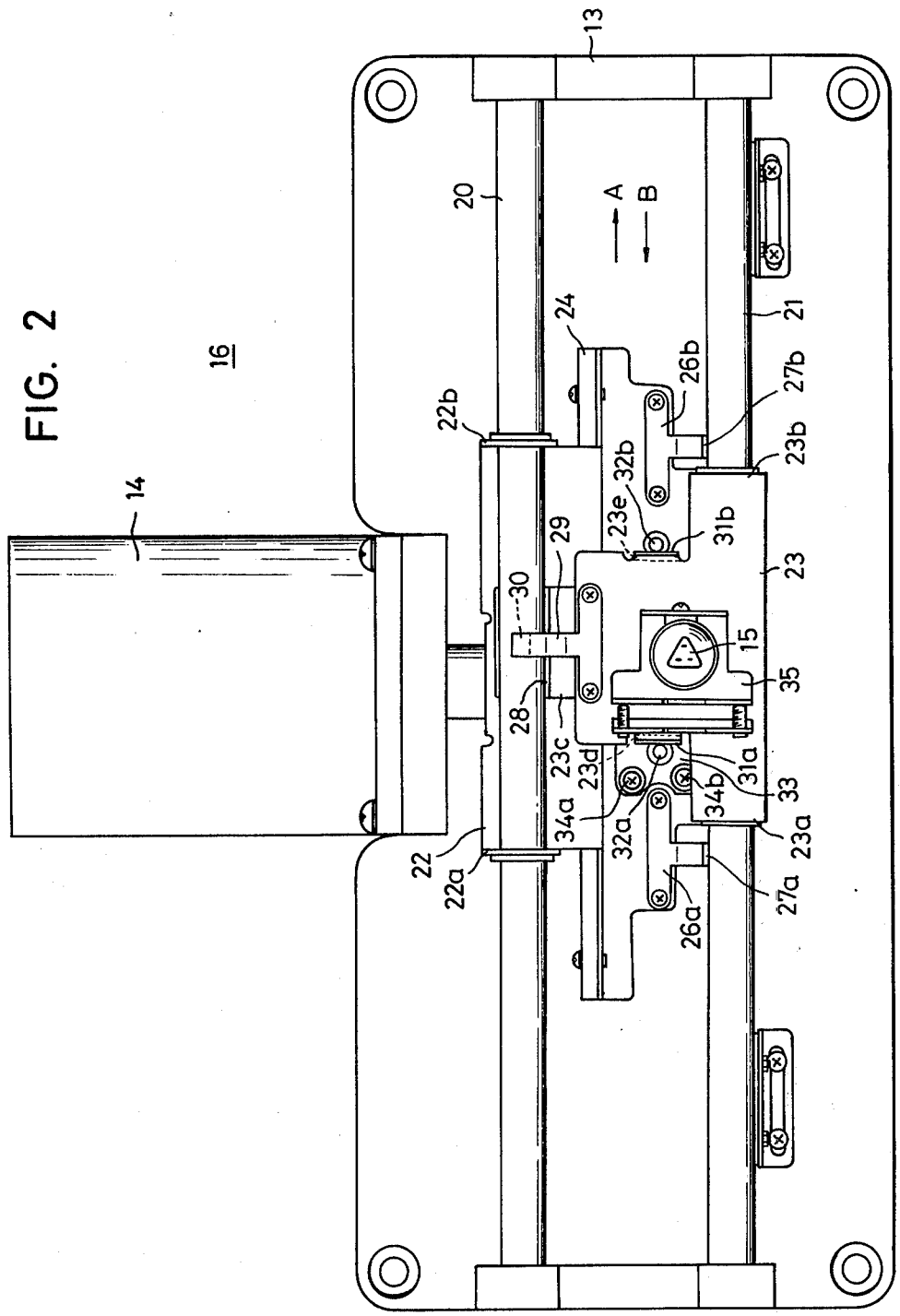
FIG. 2 is a plan view of one embodiment of a transducer feeding mechanism according to the invention.

In the example of an apparatus for recording a rotary recording medium illustrated in FIG. 1, a rotary magnetic disc 10 having a magnetic surface on its lower face is rotated at a rotational speed of, for example, 60 revolutions per second by a disc motor 11. This disc motor 11 is mounted on a base platform 12 on the lower side thereof and has a vertical rotor shaft extending through the platform 12 and coaxially supporting the magnetic disc 10. On the upper surface of the platform 12 and below the disc 10, a frame 13 is mounted, and a stepping motor (pulse motor) 14 is mounted on this frame 13. The pulse motor 14 is supplied with driving pulses and rotates intermittently. A magnetic head assembly 15 is intermittently fed stepwise in the radial direction of the magnetic disc 10 inwards or outwards as indicated by arrow A or B by a feeding mechanism 16 described below. The magnetic head assembly 15, during its periods of rest, records on and/or reproduces from the magnetic disc 10 with circular tracks and with one field unit per track. The feeding of the magnetic head 15 is carried out in correspondence with the vertical synchronizing signal period of the video signal.

Figure 3:
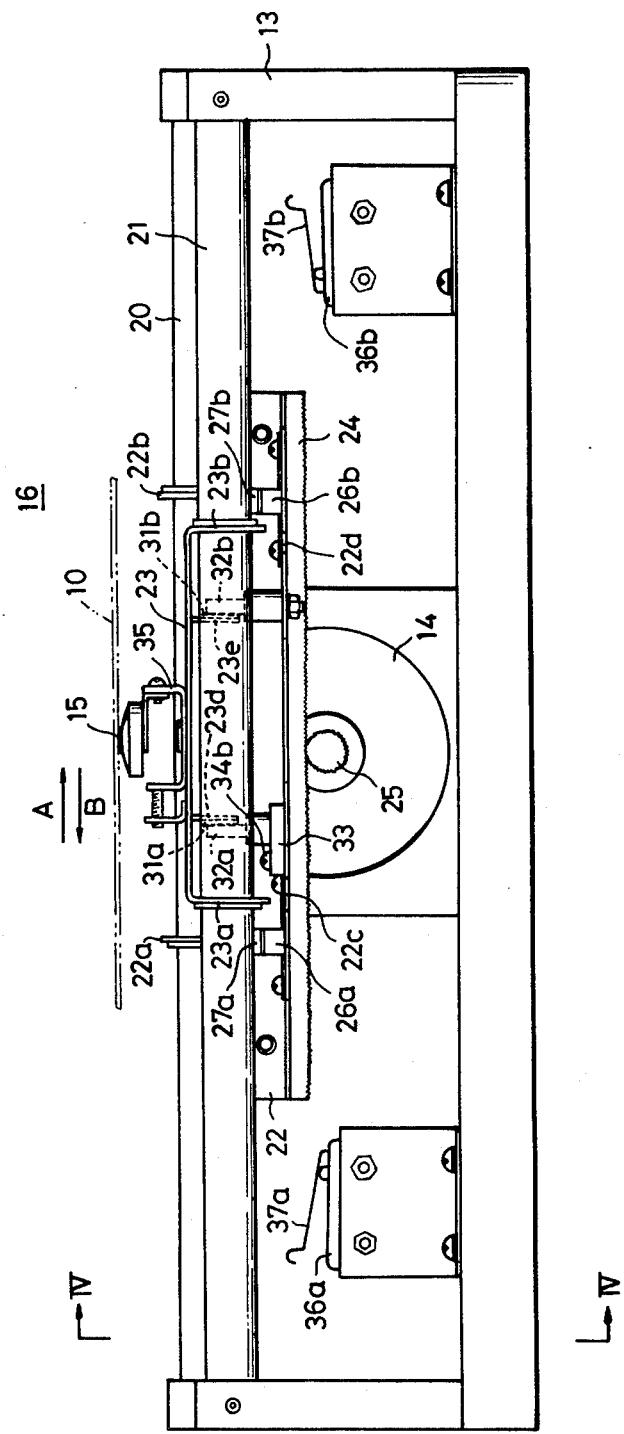
FIG. 3 is a front elevational view of the mechanism illustrated in FIG. 2.

One embodiment of the feeding mechanism 16 according to the invention is shown in FIGS. 2, 3, and 4. A pair of parallel guide bars 20 and 21 are rigidly supported by the frame 13. A first feeding carriage 22 at its bent parts 22a and 22b and a second feeding carriage 23 at its bent parts 23a and 23b are respectively fitted on the guide bars 20 and 21 in a closely fitting manner without play and, moreover, slidably in the longitudinal direction of the guide bars. As shown in FIG. 4, the feeding carriage 22 and the feeding carriage 23 are respectively free to rotate in the arrow directions C and D and the arrow directions E and F about the guide bars 20 and 21, respectively.

On the first feeding carriage 22 is mounted a rack 24 which is of a length corresponding to at least the feeding stroke of the magnetic head 15 relative to the magnetic disc 10, and which has rack teeth on its lower part. This rack 24 is meshed with the upper part of a pinion 25 provided on the rotor shaft of the pulse motor 14. The rack 24 and the pinion 25 are both formed with small teeth and thereby have relatively large numbers of teeth.

A pair of T-shaped leaf springs 26a and 26b are mounted on the first feeding carriage 22. The atem parts of these leaf springs 26a and 26b are provided at their free end parts with sheets 27a and 27b bonded respectively thereto. These sheets 27a and 27b are made of a material of low coefficient of friction such as, for example, polytetrafluoroethylene (hereinafter referred to by its trade name "Teflon"). The above mentioned free end parts of the leaf springs 26a and 26b are pressed by elastic spring force against the lower surface of the guide bar 21 over the teflon sheets 27a and 27b interposed therebetween. The first feeding carriage 22 is urged by the elastic force of these leaf springs 26a and 26b to rotate in the arrow direction C about the guide bar 20. Here, the rack 24 is disposed at a position separated by a distance on the leaf spring side from the guide bar 20. For this reason, and as a result of the above mentioned urging of the feeding carriage 22 in the arrow direction C, the rack 24 is also urged in the same direction and positively pressed into enmeshment with pinion 25 until there is substantially no backlash therebetween.

A bent part 23c of the second feeding carriage 23 is in pressed contact with the lower surface of the guide bar 23 over a Teflon sheet 28 bonded onto the upper surface of the bent part 23c and interposed therebetween. A T-shaped leaf spring 29 mounted on the second feeding carriage 23 has a leg part with a free end part to which a teflon sheet 30 is bonded, and this free end part is pressed by elastic spring force against the upper surface of the guide bar 20 over the teflon sheet 30 interposed therebetween. Therefore, the leaf spring 29 and the bent part 23c of the second feeding carriage 23 are clamping the guide bar 20 with the elastic spring force of the leaf spring 29.

Bent parts 23d and 23e extending downwards are formed on opposite sides of the second feeding carriage 23. Telfon sheets 31a and 31b are bonded on the outer faces of these bent parts 23d and 23e. Engagement pins 32a and 32b for contacting the bent parts 23d and 23e respectively over the teflon sheets 31a and 31b are provided vertically on the first feeding carriage 22. The engagement pin 32a is embeddedly fixed at its lower end to a plate 33, which is mounted on the first feeding carriage 22 with screws 34a and 34b. The engagement pin 32b is embeddedly fixed at its lower end directly to the first feeding carriage 22. At the time of assembly, the engagement pin 32a is pressed against the bent part 23d over the teflon sheet 31a with the bent part 23e pressed against the engagement pin 32b over the teflon sheet 31b, and thereafter the plate 33 is fixed in its position by tightening the screws 34a and 34b.

By the above described arrangement, the first and second feeding carriages 22 and 23, while being respectively rotatable in a mutually independent manner with respect to guide bars 20 and 21, respectively, in FIG. 4, move unitarily as an integral structure in the arrow directions A and B in FIGS. 2 and 3 as a consequence of the contacting engagement without play between the engagement pins 32a and 32b and the bent parts 23d and 23e over the Teflon sheets 31a and 31b interposed therebetween.

A head mounting base 35 is secured to the upper part of the second feeding carriage 23 and supports the magnetic head assembly 15 mounted thereon. For this magnetic head assembly 15, a magnetic head assembly such as that disclosed in U.S. Pat. Nos. 3,673,352 or 3,763,331 can be employed.

When, with the apparatus in the recording or reproducing mode of operation, the pulse motor 14 undergoes intermittent rotation, the pinion rotates intermittently, whereby the rack 24 meshed therewith is moved intermittently in transition in the arrow direction A or B. As a consequence, the first feeding carriage 22 moves unitarily with the rack 24, and the second feeding carriage 23 is pushed by the engagement pin 32a or 32b and thus moved in the feeding direction, whereby the magnetic head assembly 15 is advanced in intermittent feeding motion in the radial direction as indication by arrow A or B relative to the magnetic disc 10. During its period of rest between its intermittent advancing movements, the magnetic head assembly 15 records or reproduces a video signal of one field per track on or from the magnetic disc 10. In this operation, since there is no gap between the engagement pins 32a and 32b and the bent parts 31a and 31b, the second feeding carriage 23 is moved unitarily with the first feeding carriage 22 without play therebetween in the feeding direction.

When the magnetic head assembly 15 reaches the outermost peripheral position or the innermost position on the magnetic disc 10, a projection 22c or 22d provided on the first feeding carriage 22 pushes an actuator 37a or 37b of a microswitch 36a or 36b thereby to close the switch, whereby the arrival of the magnetic head assembly 15 at the outermost peripheral position or the innermost position is detected.

Since the rack 24 is being pressed against the pinion 25 by the elastic spring force of the leaf springs 26a and 26b during the above described feeding movement, as described hereinbefore, the backlash between the rack 24 and the pinion 25 is of a small value of an order which is substantially negligible. For this reason, the magnetic head assembly 15 is advanced intermittently with accurate pitch, and, moreover, concentric tracks of true circles are formed with accurate track pitch without wobbling at the time of stoppage of the intermittent advance. Particularly when the magnetic head assembly 15 reaches the outermost peripheral position or the innermost position of the magnetic disc 10, and the pulse motor 14 is reversed in its direction of intermittent rotation in order to reverse the direction of travel of the magnetic head assembly 15, the magnetic head assembly 15 is fed in the reversed direction with accurate specific pitch without pitch deviation since, as described above, the backlash between the rack 24 and the pinion 25 is in a substantially nonexistent state.

Since, by the use of the mechanism of this invention, the magnetic head assembly can be caused to advance intermittently and reverse its travel direction with vary accurate pitch without wobbling at the time of rest, the backguard bands (unrecorded bands) between tracks as allowance for track deflection can be made vary narrow. For this reason, the number of tracks on the magnetic disc 10 can be increased over that of a similar recording medium of the prior art, and the recording capacity of the disc can be increased.

The case where, as a result of assembly errors in the above described feeding mechanism, the pinion 25 undergoes eccentric rotation, or the guide bars 20 and 21 are not perfectly parallel will now be considered. Although these errors are undesirable, they are inevitable to a certain extent at the time of assembly.

For example, in the case of the above mentioned eccentric rotation of the pinion 25, since the first feeding carriage 22 is being urged to move in the arrow direction C by the leaf springs 26a and 26b, the first feeding carriage 22 undergoes displacement in the arrow direction C, D as the leaf springs 26a and 26b undergo deflection deformation in accordance with this eccentric rotation, and the rack 24 is continually maintained in a meshing state with the pinion 25 with substantially negligible backlash. Furthermore, in the case where the guide bars 20 and 21 are not parallel, also, the leaf springs 26a and 26b undergo deflection in accordance with the degree of unparallelism of the guide bars, and the above mentioned meshing state of the rack 24 and the pinion 25 is maintained unchanged.

Here, since the feeding carriages 22 and 23 are in contacting engagement only with respect to the arrow directions A and B as a result of the contactation of the engagement pins 32a and 32b and the bent parts 23d and 23e, the second feeding carriage 23 is not influenced at all by any displacement of the first feeding carriage 22 in the arrow direction C or D. Since the bent parts 23d and 23e are in contact with the engagement pins 32a and 32b over the teflon sheets 31a and 31b of low frictional resistance, the frictional resistance between the engagement pins 32a and 32b and the teflon sheets 31a and 31b is very small, whereby the displacement of the first feeding carriage 22 in the arrow direction C or D is not obstructed by this frictional resistance.

Furthermore, the second feeding carriage 23 is freely displaceable relative to the guide bar 20, being merely clamped from above and below by the leaf spring 29 and the bent part 23c and is rotatably supported relative to the guide bar 21. For this reason, in the case where the guide bars 20 and 21 are not parallel, the second feeding carriage 23 undergoes rotational displacement relative to the guide bar 21 in accordance with the unparallelism between the guide bars. In this case, also, the diplacement of the second feeding carriage 23 has no effect on the first feeding carriage 22 and, therefore, has no deleterious effect on the meshing state of the rack 24 and the pinion 25.

Even when there is an assembly error in the feeding mechanism in this manner, the magnetic head assembly 15 is fed accurately and positively with substantially no effect imparted thereto by the assembly error. For this reason, a certain degree of error at the time of assembly is allowable, whereby the production cost can be reduced.

Furthermore, even in the case where, after a long period of use of the aforementioned recording and reproducing apparatus, the teeth of the rack 24 and the pinion 25 become worn, the rack 24 is urged by the leaf springs 26a and 26b to mesh further with the pinion 25, and, for this reason, a meshing state wherein the backlash is substantially negligible is continually sustained.

In addition, since the feeding carriages 22 and 23 are in engagement because of the engagement pins 32a and 32b and the bent parts 23d and 23e, even if there is an occurrence such as shock or vibration on the side of the second feeding carriage 22 within a plane perpendicular to the feeding direction thereof, this shock or vibration will not be transmitted to the second feeding carriage 23.

In the embodiment of the invention shown in FIG. 1, only a single head feeding mechanism is provided, but an arrangement wherein two mechanisms are provided to advance the magnetic head alternately in intermittent movements may be used. Furthermore, for the recording and reproducing system, a system such as that disclosed in, for example, U.S. Pat. Nos. 3,649,752 or 3,761,604 can be applied.

Further, this invention is not limited to these embodiments but various variations and modifications may be made without departing from the scope and spirit of the invention.

What is claimed is:

1. A transducer feeding mechanism in an apparatus for recording and reproducing a signal on and from a rotary recording medium by means of a transducer fed over the recording medium in the radial direction thereof, said mechanism comprising:
   a rotational motive power source having a rotary shaft and a pinion provided on the shaft;
   a rack meshed with said pinion and fed in translational movement by the rotation of the pinion;
   at least two guide bars extending parallelly in the direction of feeding of the transducer;
   a first feeding carriage on which the rack is mounted, and which is guided by one of the guide bars;
   biasing means provided on the first feeding carriage and functioning to contact another guide bar in an elastic manner and to urge the first feeding carriage in a direction to cause the rack to mesh further with the pinion;
   a second feeding carriage on which the transducer is mounted, and which is guided by said other guide bar;
   a guide member mounted on the second feeding carriage and contacting in a rotationally displaceable manner said one of the guide bars; and
   engagement means functioning to place the first and second feeding carriages in contacting engagement in the feeding direction along the guide bars and in a mutually displaceable state within a plane perpendicular to the feeding direction.

2. A transducer feeding mechanism as claimed in claim 1 in which said engagement means comprises a pair of engagement pins standing upright on the first feeding carriage and a pair of bent parts provided in the second feeding carriage and contacting and engaging said pins with respect to said feeding direction without play therebetween.

3. A transducer feeding mechanism as claimed in claim 2 in which said engagement means has, at the contacting and engaging surfaces of said engagement pins and said bent parts, pieces of a material of low frictional resistance for reducing the sliding frictional resistance of the engagement pins and the bent parts in the plane perpendicular to the feeding direction.

4. A transducer feeding mechanism as claimed in claim 1 in which said guide member comprises a guide part provided integrally with said second feeding carriage and contacting the lower surface of said one of the guide bars and a leaf spring mounted on the second feeding carriage and elastically contacting the upper surface of said one of the guide bars.

5. A transducer feeding mechanism as claimed in claim 1 in which said biasing means comprises a leaf spring mounted on the first feeding carriage and contacting with elastic force the lower surface of said other guide bar, and the rack is engaged with the upper side of the pinion, said leaf spring urging the first feeding carriage in a rotational direction with respect to said one of the guide bars in a manner such that the rack meshes further with the pinion.

6. A transducer feeding mechanism as claimed in claim 2 in which one of said pair of engagement pins is fixedly provided on the first feeding carriage, and the other engagement pin is mounted in a position-adjustable manner on the first feeding carriage.

7. A transducer feeding mechanism as claimed in claim 1 in which said rotational motive power source is a stepping motor for rotating intermittently, and the rack, the first and second feeding carriages, and the transducer are fed intermittently in translational movement.

8. A transducer feeding mechanism as defined in claim 1, wherein said engagement means comprises a pair of engagement pins standing upright on the first feeding carriage and a pair of bent parts in the second feeding carriage and contacting engagingly said pins with respect to said feeding direction without play therebetween, said engagement means having pieces of a material of low frictional resistance for reducing sliding frictional resistance of the engagement pins and the bent part in the plane perpendicular to the feeding direction, said pieces of said material being at the contacting and engaging surfaces of said engagement pins and said bent parts, said guide member comprising a guide part integrally with said second feeding carriage and contacting the lower surface of said one of the guide bars and a leaf spring mounted on the second feeding carriage and elastically contacting the upper surface of said one of the guide bars, said biasing means comprising a leaf spring mounted on the first feeding carriage and contacting with elastic force the lower surface of said other guide bar, said rack being engaged with the upper side of the pinion, said leaf spring urging the first feeding carriage in a rotational direction with respect to said one of the guide bars so that the rack meshes further with the pinion, said pair of engagement pins being fixedly on the first feeding carriage, and the other engagement pin being mounted adjustably in position on the first feeding carriage, said rotational motive power source being a stepping motor for rotating intermittently, said rack, said first and second feeding carriages and the transducer being fed intermittently in translational movement.

9. A transducer feeding mechanism as defined in claim 1 wherein impact is transmitted from the first carriage to the second carriage only in the feeding direction, said rack and pinion being sustained in meshing state under substantial assembly errors in the feeding elements and under substantial eccentric rotation of the pinion and with substantial wear of said rack and pinion, said first and second feeding carriages being free of contacting engagement in directions perpendicular to the feeding direction.

* * * * *